INVENTORS
GROVER B. PENNINGTON
RICHARD P. NELSON
BY Carl C. Baty
ATTORNEY

Aug. 25, 1970     G. B. PENNINGTON ET AL     3,525,119

APPARATUS FOR FORCE FEEDING ROUND FLEXIBLE STRANDS

Filed Aug. 3, 1967     4 Sheets-Sheet 2

INVENTORS
GROVER B. PENNINGTON
RICHARD P. NELSON

BY *Carl C. Batz*
ATTORNEY

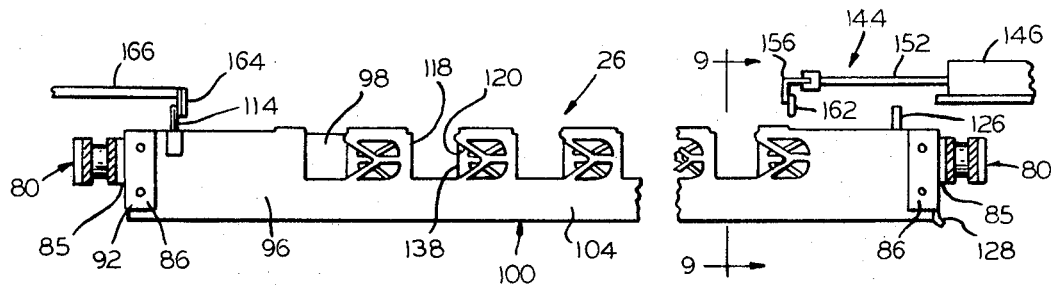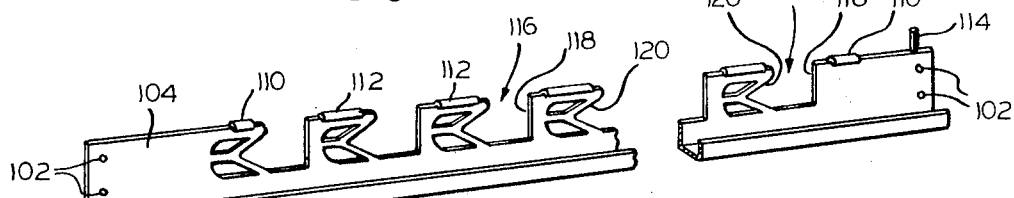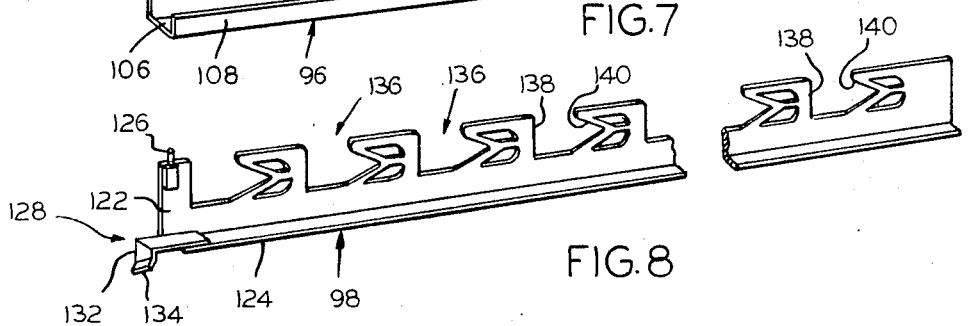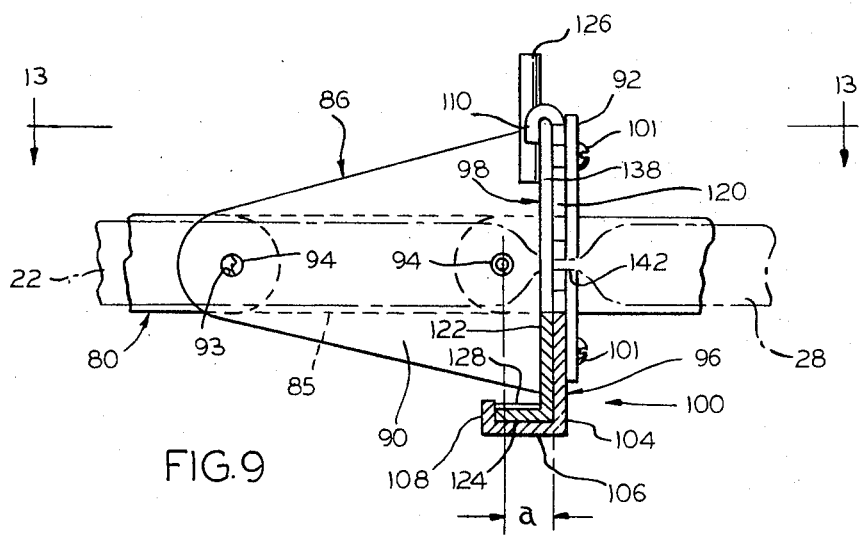

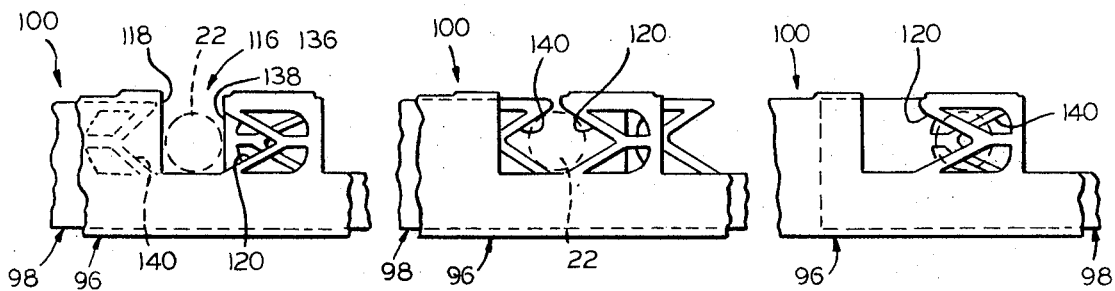
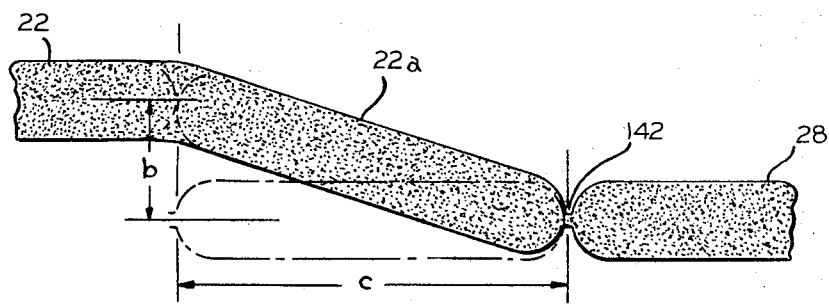
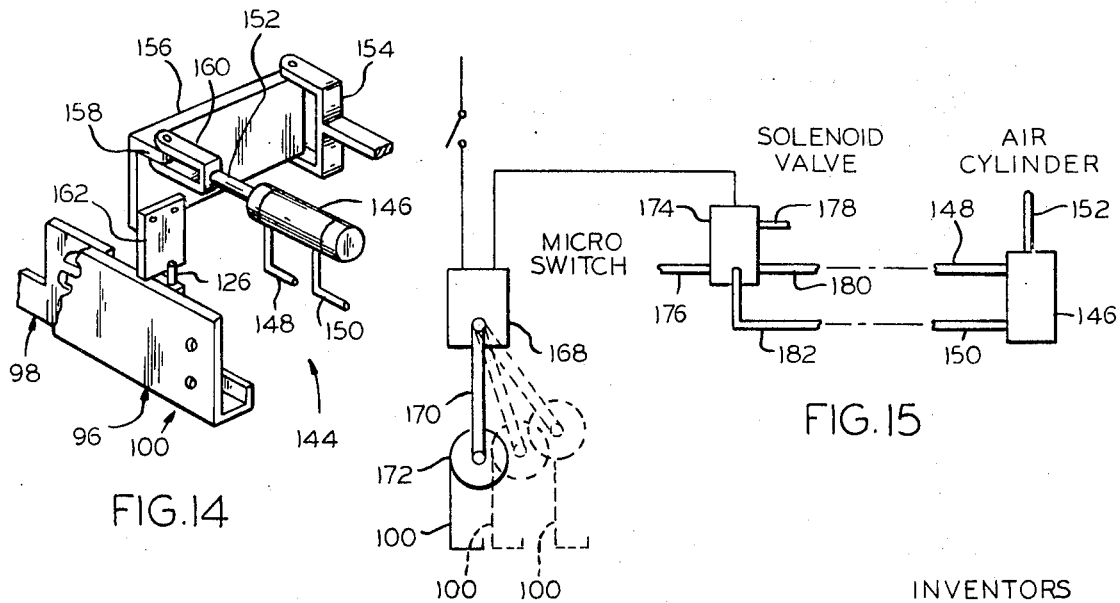

United States Patent Office 3,525,119
Patented Aug. 25, 1970

3,525,119
APPARATUS FOR FORCE FEEDING ROUND FLEXIBLE STRANDS
Grover B. Pennington, Kansas City, Kans., and Richard P. Nelson, Kansas City, Mo., assignors to Armour and Company, Chicago, Ill., a corporation of Delaware
Filed Aug. 3, 1967, Ser. No. 658,257
Int. Cl. A22c 11/10
U.S. Cl. 17—34                6 Claims

ABSTRACT OF THE DISCLOSURE

Apparatus for force feeding round flexible strands to processing equipment, including a horizontally extending conveyor belt having a concave carrying surface, drive means, guide means, and pressure roller. The strand feeding apparatus is combined in multiple and synchronized with a strand linking conveyor having successive transverse linking bar assemblies.

---

This invention relates to apparatus adapted for force feeding round flexible strands to processing equipment. The invention further relates to a combination of such apparatus with sausage linking apparatus.

Various products are made by producing long flexible strands of material and subsequently processing the strands to produce finished products. Thus, for example, sausage products such as frankfurters are produced by stuffing a comminuated meat mixture into long lengths of a suitable casing such as tubular cellulose film. The resulting strands subsequently are linked or divided into sections, smoked, and cooked. Other examples of the production of flexible strands of material and subsequent processing of the strands are found in the manufacture of candy and products made from dough.

Difficulties and delays are encountered in supplying the strands of material to processing equipment, owing to their length, flexibility, and frequent tendency to rupture. For example, in one prior method, sausage strands issue from a stuffer onto a table, and the strands are supplied manually from there to a lining apparatus. It is inconvenient and time-consuming to handle the strands collected on the table, and it is necessary to remove loops and tangles in the strands. Care and attention on the part of the operator are required in supplying the strands to the linking apparatus. The strands have a tendency to break under tension, interferring with the operation of the linking apparatus.

Copending patent application Ser. No. 535,872 of James P. Smithers and Millard J. Hafstad for Method and Apparatus for Collecting Flexible Strands discloses a manner and means for collecting the strands in an orderly manner in holders or boxes, so that the strands are readily removed for supply to lining apparatus. The present invention provides apparatus for removing the strands from such holders or other suitable supply sources, and feeding the strands automatically to linking apparatus such as disclosed in patent application Ser. No. 658,255, filed Aug. 3, 1967, of Thomas H. Bush and Richard P. Nelson for Apparatus for Linking Sausage Strands.

An important object of the invention is to provide apparatus for force feeding round flexible strands in a given direction and alignment, for cooperation with processing apparatus.

Another object is to provide a combination of strand feeding apparatus and sausage linking apparatus, which insures a positive supply of strands to the linking apparatus in correct alignment and at a rate which avoids excess tension in the strands such as might lead to rupture.

An additional object is to provide force feeding apparatus which cooperates with linking apparatus so that in the event a strand breaks when it is linked, the feeding of the strand continues without interruption.

A further object is to provide apparatus for force feeding round flexible strands and a combination of linking apparatus therewith which are well suited for processing a plurality of strands at the same time and in a continuous manner for large scale production.

Another object is to provide strand feeding apparatus which is constructed and operated simply, economically, and reliably, and which requires a minimum of attention.

These and other objects, advantages, and functions of the invention will be apparent on reference to the specification and to the attached drawings illustrating a preferred embodiment of the invention, wherein like parts are identified by like reference symbols in each of the views, and wherein:

FIG. 6 is an enlarged broken vertical transverse sectional view of the suasage linkage apparatus, taken on line 6—6 of FIG. 1, particularly illustrating a linking bar assembly;

FIGS. 7 and 8 are broken perspective views of the linking bars in the assembly of FIG. 6, viewed from the opposite side thereof;

FIG. 9 is a further enlarged cross sectional view of the linking bar assembly, taken on line 9—9 of FIG. 6, showing a linked sausage strand in phantom lines;

FIGS. 10–12 are enlarged fragmentary views of the linking bar assembly as viewed in FIG. 6, illustrating its closing sequence in performing the linking operation;

FIG. 13 is an enlarged fragmentary plan view of a sausage strand, as viewed on line 13—13 of FIG. 9, illustrating its configuration adjacent to the linking station;

FIG. 14 is an enlarged fragmentary perspective view of the linking bar assembly and apparatus for closing the assembly to perform the linking operation;

FIG. 15 is a diagrammatic view of apparatus for actuating the linking bar assembly closing apparatus.

The invention provides apparatus for force feeding round flexible strands in a given direction and alignment which includes a conveyor belt having a concave carrying surface, means for driving the belt along a horizontally extending path, and a pressure roller having a concave surface and aligned with the belt for feeding a strand cooperatively therebetween. Preferably, guide means are mounted in advance of the belt for aligning the strand with the belt as it is fed. The apparatus is combined to particular advantage with apparatus for linking sausage strands, including a linking conveyor having successive transverse linking bars recessed for receiving the strands therein, and means for driving the conveyor along a path extending horizontally in a given direction. The feed conveyor belt is driven along a path extending horizontally in the same direction as the linking conveyor path and aligned with the recesses in the linking bars.

Figure 1:
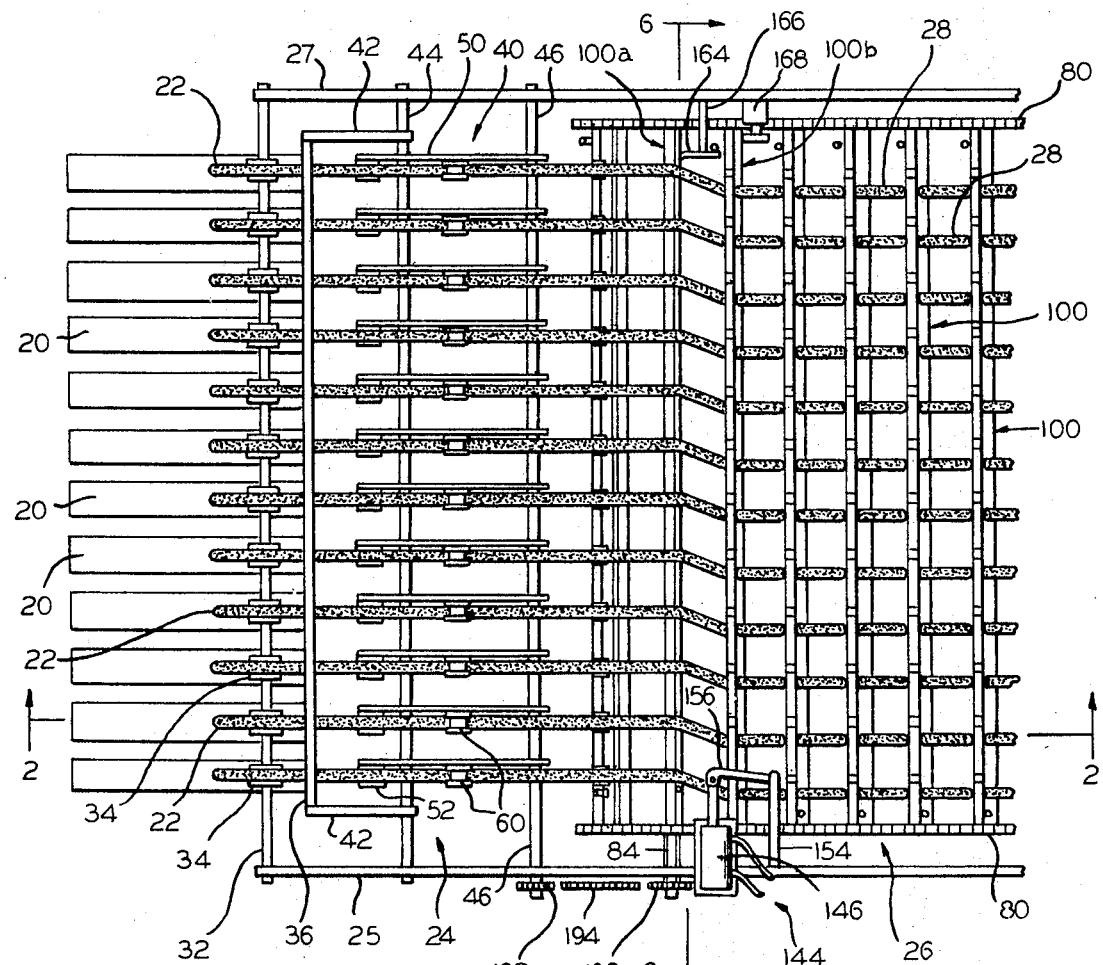
FIG. 1 is a plan view of apparatus for force feeding flexible sausage strands and of one end of sausage linking apparatus associated therewith, illustrating the manner in which a pluarality of strands are removed from strand holders serving as supply sources and are fed to the linking apparatus.
Figure 2:
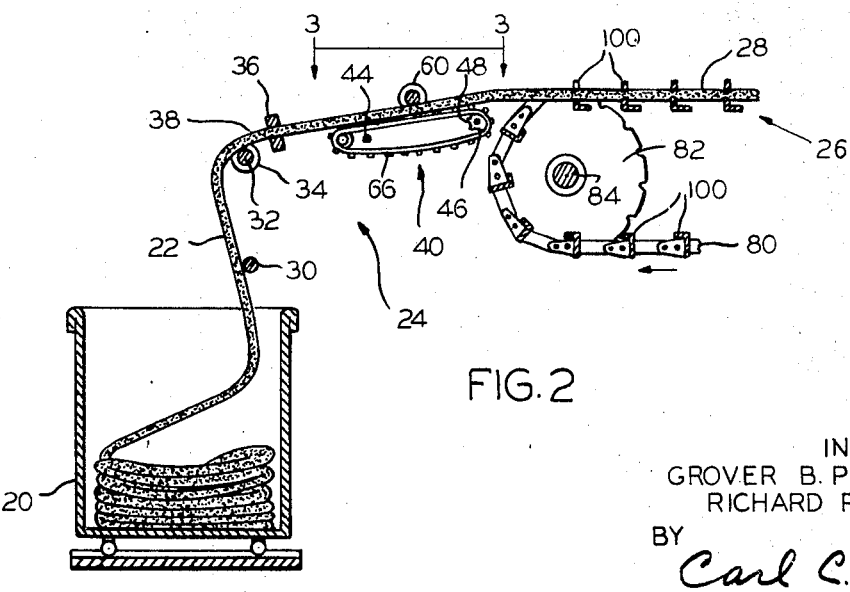
FIG. 2 is a longitudinal sectional view of the apparatus of FIG. 1, taken on lines 2—2 thereof.

Referring to FIGS. 1 and 2 of the drawings, the apparatus illustrated includes a bank of twelve open top strand holders 20 each holding a long vertically folded sausage strand 22, a feeder assembly 24, and a linking conveyor 26. The feeder assembly and the linking conveyor are bounded by side plates 25 and 27. The sausage strands are removed from the holders by the feeder assembly, and the feeder assembly force feeds the strands in parallel to the linking conveyor. The linking conveyor subdivides the strands into successive sausage links 28, and conveys the links to smoking, cooking and cooling stations in processing apparatus, not shown, farther along the path of the conveyor.

The feeder assembly 24 includes a transverse horizontal bumper rod 30, a transverse horizontal mounting rod 32, a row of twelve spaced guide rollers 34 on the mounting rod, a transverse horizontal forwardly inclined guide bar 36 having a row of spaced circular guide holes 38 therein, and a group of twelve spaced parallel feed conveyors 40 in transverse alignment. The sausage strands 22 are removed from the holders 20 and are conducted individually over the guide rollers 34 and through the guide holes 38 to the feed conveyors 40, from whence they are fed to the linking conveyor 26.

The bumper rod 30 is mounted on the side plates 25 and 27 in spaced relation above the holders 20, and it insures that the strands are properly supplied to the guide rollers 34. The mounting rod 32 is mounted on the side plates in spaced relation above the bumper rod. The guide rollers are rotatably mounted on the mounting rod in vertical alignment with respective holders. The guide rollers are grooved to provide an arcuate concave surface on each conforming generally to the contour of a strand. The guide bar 36 is mounted on arms 42 secured to a transverse horizontal support rod 44 mounted on the side plates. The guide bar is mounted behind and slightly upwardly from the guide rollers. The guide holes 38 are longitudnally aligned with respective guide rollers, and the holes have diameters slightly greater than the diameter of the strands 22.

The feed conveyors 40 are mounted on the support rod 44 and on a transverse horizontal drive shaft 46 mounted on the side plates. The feed conveyors are longitudinally aligned with respective guide holes 38 and guide rollers 34, and are inclined slightly, upwardly and rearwardly from the guide bar. In the illustrative embodiment, the guide rollers, the guide holes, and the feed conveyors are spaced apart transversely on three-inch centers, for feeding the strands 22 in spaced parallel longitudinally extending relation on like centers. The strands are fed along substantialy straight paths to the linking conveyor 26.

Figure 3:
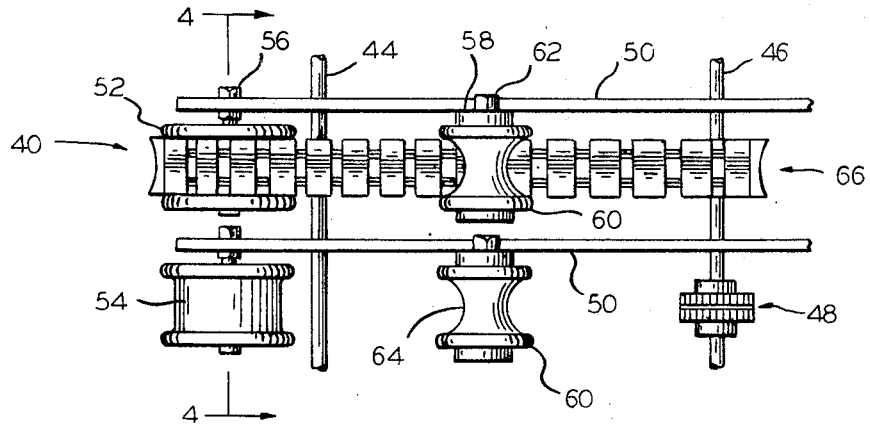
FIG. 3 is an enlarged plan view of part of the strand feeding apparatus, taken on line 3—3 of FIG. 2, illustrating one of the feed conveyors thereof with its belt removed.
Figures 4, 5:
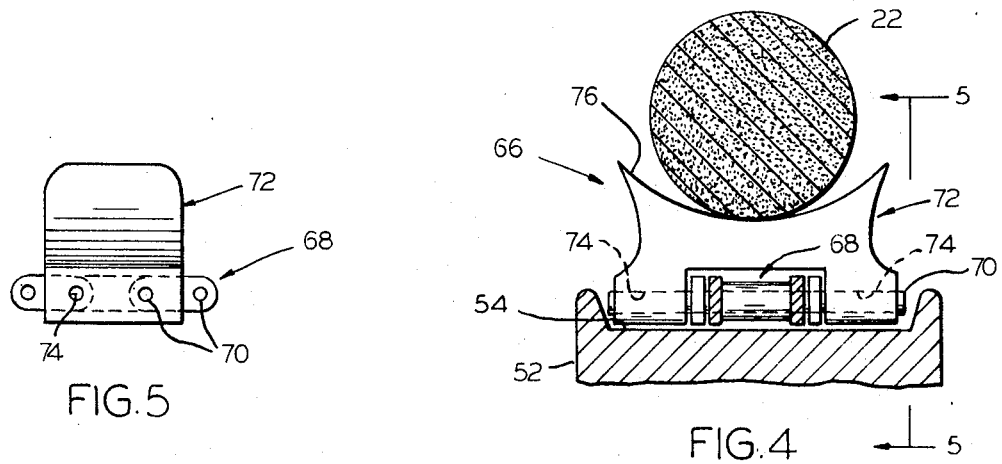
FIG. 4 is a further enlarged fragmentary cross sectional view of a feed conveyor and a sausage strand thereon, taken on line 4—4 of FIG. 3.
FIG. 5 is a side elevational view of a feed conveyor belt section, taken on line 5—5 of FIG. 4.

Referring also to FIGS. 3–5, the feed conveyors 40 include dual drive sprockets 48 mounted in spaced relation along the drive shaft 46, there being one such sprocket for each conveyor. Longitudinally extending mounting bars 50 are mounted on the drive shaft and support rod 44, one for each conveyor. Each conveyor includes an idler roller 52 having a flat groove 54 therein. The rollers are mounted on the forward ends of the mounting bars, by screw pin and nut connections 56. A roller bracket 58 is secured to the inside of each mounting bar 50 about midway between its ends and extends upwardly from the bar. A pressure roller 60 is mounted on the upper end of each roller bracket, by a screw pin and nut connection 62. Each pressure roller has a peripheral groove 64 therein, resulting in an arcuate concave surface conforming generally to the contour of a strand 22. The idler roller 52, the pressure roller 60 and the sprocket 48 in each feed conveyor are mounted in longitudinal alignment.

Each feed conveyor 40 includes a conveyor belt 66 (Ty-Linker belt) trained over the sprocket 48 and the idler roller 52 beneath the pressure roller 60. The belt includes and endless link chain 68 having elongated link pins 70 extending from opposite sides thereof. Carrying elements 72 bridge the chain and are mounted on the extending portions of the pins 70. Two adjacent pins are received in a pair of openings 74 on each side of each element. The elements are constructed of rubber or other suitable material, and each is provided with an arcuate concave carrying surface 76 conforming generally to the contour of a strand 22. The concave surfaces of the carrying elements provide a discontinuous carrying surface on the belt.

The conveyor belt chain 68 is drivingly engaged by the sprocket 48, and the belt is received in the groove 54 of the idler roller 52. The conveyor belt is driven on approximately 9 inch centers. The pressure roller 60 is aligned with the conveyor belt thereabove for feeding a strand 22 cooperatively therebetween, advancing the strand longitudinally on the upper surface of the belt.

Referring to FIGS. 1, 2 and 6–9, the linking conveyor 26 includes a pair of spaced parallel longitudinally extending conveyor chains 80 and a plurality of spaced parallel transversely extending linking bar assemblies 100 mounted on the conveyor chains. The sausage strands 22 are supplied by the feed conveyors 40 to the linking bar assemblies. The strands are formed into the links 28 by the linking bar assemblies and conducted thereon to the processing apparatus.

The conveyor chains 80 are endless link chains, and they are trained over a pair of forward drive sprockets 82 mounted on a shaft 84. In the illustrative embodiment, 2½ inch extended pitch chains are employed. The chains travel in a horizontal straight upper run in the conveyor section illustrated.

Each linking bar assembly 100 includes a fixed linking bar 96, a movable linking bar 98, and a pair of mounting brackets 86 secured to opposite ends of the fixed linking bar. The linking bar assemblies are mounted on the chains 80 by the mounting brackets, and the assemblies are mounted successively on inconsecutive chain links 85 entirely around the chains.

As seen in FIGS. 6 and 9, the mounting brackets 86 are mounted on individual chain links 85, on the inner sides of the respective chains 80. Each bracket includes a triangular side portion 90 and a rectangular end portion 92 perpendicular to the side portion. The side portion of each bracket is provided with a pair of mounting holes 93 which receive the link pins 94 for mounting the bracket thereon. The end portion of each bracket as mounted extends transversely inwardly of the conveyor.

The fixed linking bar 96 is an angle bar having perpendicular sides 104 and 106. One side 104 is normal to the conveyor path and upright in the horizontal run of the conveyor, and the remaining side 106 is parallel to the path and horizontal in such run. Threaded holes 102 are provided in the upright side adjacent the ends of the bar, and the mounting brackets are fixed to the bar by screws 101 inserted through the end portions 92 of the brackets into the threaded holes.

A guide flange or lip 108 is integral with the outer edge of the horizontal side 106 of the fixed linking bar, and it extends perpendicularly upwardly from the side therealong. End and intermediate guide flanges 110 and 112 are integral with the outer or upper edge of the upright side 104 of the fixed linking bar, and they extend upwardly and are reversely bent downwardly over the side in spaced relation thereto. A holding pin 114 is secured on the outside of the upright side and projects upwardly therefrom adjacent to and spaced from one end of the bar.

A plurality of spaced apart-strand-receiving recesses 116 are provided in the upright side 104 along its outer or upper margin between successive guides 110 and 112, and the recesses open upwardly. One side 118 of each recess, nearer one end of the bar, is substantially vertical, and the opposite side 120 of each recess, nearer the opposite end of the bar, is generally V-shaped extending longitudinally of the bar, with the apex or pocket of the V-formation rounded.

The movable linking bar 98 is an angle bar having an upright side 122 and a horizontal side 124 perpendicular thereto, similarly to the fixed linking bar 96. An operating pin 126 is secured on the inside of the upright side and projects upwardly therefrom, at one end of the bar. A spring latch 128 is secured on the inside of the horizontal side at the same end of the bar. The latch extends outwardly from the end of the bar ind is formed to provide a downturned hook portion 132 and an inclined outwardly flaring end 134.

The movable linking bar 98 is provided with a plurality of upwardly opening spaced strand-receiving recesses 136 in the upright side 122 along its outer or upper margin. The recesses are complementary to the recesses 116 in the fixed bar 96 and are arranged for registry therewith. The movable bar recesses include vertical sides 138 and opposite V-shaped sides 140 like the sides of the recesses on the fixed bar, except that the sides in the movable bar are transposed with reference to those on the fixed bar when the bars are assembled, as illustrated in FIG. 6.

As illustrated in FIGS. 6 and 9, the movable linking bar 98 is received in nesting relation on the fixed linking bar 96, with the horizontal side 124 of the former on the horizontal side 106 of the latter between the guide flange 108 and the upright side 104 thereof. The upright sides 104 and 122 of the bars are adjacent to each other, and the upper margin of the movable bar upright side 122 is received within the guide flanges 110 and 112 on the fixed bar. The operating pin 126 on the movable bar and the holding pin 114 on the fixed bar are at opposite ends of the resulting assembly. The movable bar is slidable on the fixed bar, longitudinally of the bars and transversely of the conveyor. The guide flanges on the fixed bar secure the linking bars against relative lateral displacement. While the illustrative structure is preferred, guide flanges may be provided on either or both of the linking bars.

In the linking bar assemblies 100, the apices of the V-shaped sides 120 and 140 of the bar recesses lie in a common plane with the axes of the bracket mounting holes 93 and thus in a common plane with the pivotal axes of the chain links 85 on which the brackets 86 are mounted, or the axes of the link pins 94. The upright sides 104 and 122 of the linking bars, more particularly the adjacent surfaces thereof, are supported by the brackets outwardly beyond the pivotal axes of the chain links. In the illustrative embodiment, the upright side 104 of the fixed bar 96 is approximately one-half inch beyond the axis of the nearest link pin 94, as represented by the distance *a* in FIG. 9.

The movable linking bar 98 moves on the fixed linking bar 96 in the assembly 100 as illustrated in FIGS. 10–12. The linking bars initially are placed in the relative positions illustrated in FIG. 10. The recesses 116 and 136 on the respective bars are in register, so that a strand 22 may be received from above in each registering pair of recesses. As the movable bar 98 is moved on the fixed bar 96, the bars assume a relation as illustrated in FIG. 11, where the opposed V-shaped sides 120 and 140 on the respective bars approach each other with the strand 22 therebetween. Further movement of the movable bar brings the apices of the V-shaped sides almost together while moving the strand transversely, as illustrated in FIG. 12, constricting the strand at its intersection with the bars to a narrow neck 142 (FIG. 13) of about ⅛ inch diameter and thereby forming a link 28. This condition of the linking bar assembly also is illustrated in FIGS. 6 and 9.

Referring to FIGS. 1, 6, 14 and 15, operating mechanism 144 is mounted on the side plate 25. The mechanism includes a double-acting air cylinder 146 having air supply and vent lines 148 and 150 and a piston rod 152. A yoke member 154 extends inwardly from the side plate 25, and an inner end of an operating lever 156 having an integral lug 158 at its outer end is pivotally mounted thereon. A bifurcated link 160 is secured to the outer end of the piston rod 152 and pivotally connected to the lug 158. An engagement bar 162 is vertically adjustably secured to the outer end of the lever 156 and depends therefrom. The operating lever is reciprocally operable by the air cylinder 146, to move the engagement bar 162 inwardly and outwardly over the conveyor 26. During its inward movement, the engagement bar engages the operating pin 126 on a movable linking bar 98, to move the movable bar on a fixed linking bar 96 and close the linking bar assembly 100, as described above and illustrated in FIGS. 10–12.

A rail 164 is mounted on an arm 166 extending over the conveyor 26 from the side plate 27 on the opposite side of the conveyor. The rail engages the holding pin 114 on the fixed linking bar 96, to prevent the fixed bar from moving when the movable bar 98 is moved by the operating mechanism 144. A microswitch 168 also is mounted on the side plate 27 and extends over the conveyor 26.

As seen most clearly in FIG. 15, the microswitch 168 includes a depending lever 170 and a roller 172 on the end of the lever. The switch is electrically connected to a solenoid valve 174, in turn connected to a source of compressed air (not shown) and to the air cylinder 146. An air supply line 176 and a vent line 178 are connected to the valve. Air pressure and exhaust lines 180 and 182 are connected to the valve and to the air cylinder supply and vent lines 148 and 150.

The linking bar assemblies 100 contact the roller 172 of the microswitch to operate the switch. As a linking bar assembly is conveyed from left to right, as viewed in FIG. 15, the switch roller is engaged by the assembly in the first position shown in full lines. As the assembly continues to move, the switch lever 170 is moved by the assembly to the second position illustrated in broken lines, to close the switch contacts and operate the solenoid valve 174. Compressed air then is supplied through the valve to the air cylinder 146, to retract the piston rod 152. The movement of the piston rod causes the operating lever 156 to move inwardly, engage the engagement bar 162 with the operating pin 126 on the movable linking bar 98, and move the movable bar to close the linking bar assembly and perform the linking operation, while the assembly continues to move.

The foregoing operation continues as the microswitch roller 172 is moved into the third position illustrated in broken lines in FIG. 15. As the assembly 100 moves beneath the roller, the roller falls back over the assembly, passes through the second position, and returns to the first position. The switch contacts open at the second position, and the solenoid of valve 174 is de-energized. The air flow in the valve pressure and exhaust lines 180 and 182 is reversed, thereby extending the piston rod 152. The operating lever 156 is moved outwardly into its initial position, completeing the operating cycle.

Prior to and during the closing movement of the movable linking bar 98, the latch 128 (FIG. 8) on the movable bar rides on the horizontal side 106 of the fixed linking bar 96. When the assembly is closed, the latch snaps over the adjacent end of the horizontal side of the fixed bar (see FIGS. 6 and 16), thereby preventing relative longitudinal displacement of the bars during subsequent processing.

The sausage strands 22 are fed to the linking conveyor 26 continuously by the feeder assembly 24, and the strands are received continuously in the several recesses 116, 136 along successive linking bar assemblies 100 as they enter the upper run of the conveyor. The strands advance continuously with the assemblies. As each assembly reaches the linking station adjacent the operating mechanism 144, the assembly is closed by the operating mechanism to link or subdivide the strands. A succession of sausage links 28 is formed in each strand in this manner, between successive pairs of linking bar assemblies.

The above-described disposition of the apices of the V-shaped sides 120 and 140 of the linking bar recesses, in common planes with the pivotal axes of the chain links, results in the sausage links 28 being conveyed with their longitudinal axes in a common plane with the straight chain pivotal axes. With the upright sides 104 and 122 of the linking bars also supported outwardly beyond the pivotal axes of the chain links on which they are mounted, as described above, substantially constant distances are maintained between the ends of the sausage links during straight and articulated travel of the conveyor chains. In this manner, undue compression or tension in the links is avoided when the conveyor chains articulate over sprockets such as the illustrative sprockets 82, whether making an inside turn or an outside turn, as the conveyor travels to succeeding processing stations. The structural relationships serve to compensate for the reduced straight line distance between alternate link pins 94 as the conveyor chains travel in a circular path around the sprockets. The specific distance A of the linking bars from the axes of the adjacent link pins 94 for sausage links of a given length depends upon the size of the sprockets over which they travel. The spacing will be greater for smaller sprockets and less for larger sprockets.

Referring to FIG. 1, with the linking bar assemblies 100 spaced on 5 inch centers, the product links 28 are 4⅞ inches long. In producing the links of this size, employing the illustrative apparatus, a greater length of strand 22 is supplied initially between the assembly 100a preceding the linking station and the assembly 100b at the linking station. The additional length of strand minimizes strand breakage at the linking station due to stretching.

Thus, the strand 22 initially is fed to the registering recesses 116, 136 in the linking bars as illustrated in FIG. 10. When the movable bar 98 at the linking station is moved to the linking position illustrated in FIG. 12, the strand 22 is moved transversely at this point. The resulting configuration of the strand adjacent to the linking station is illustrated in FIG. 13. In this view, the transverse movement of the strand at the movable bar is represented by the distance b. The strand portion 22a between the successive assemblies 100a and 100b is the hypotenuse of a triangle having one side of length b and the other side of a length c equal to the perpendicular distance between successive assemblies. The length of the strand portion 22a is the square root of the sum of $b^2$ and $c^2$. The difference between this value and c represents the excess amount of strand supplied to link the strand without stretching and possibly breaking it at the neck 142.

When the links 28 are completely formed between successive assemblies 100 in this manner, they include excess strand length and are under compression. The excess amount of strand becomes advantageous in subsequent processing operations, inasmuch as shrinkage takes place and is compensated for by the excess, eliminating breakage which otherwise is experienced.

The feeder assembly 24 removes the strands 22 from the holders 20 and supplies them to the linking conveyor 26 in alignment with the registering linking bar recesses 116 and 136, as illustrated in FIGS. 1 and 10. The strands are fed to the linking conveyor at a slightly greater rate of longitudinal or horizontal travel than the rate of travel of the linking conveyor, to satisfy the above described requirement for additional length of the strand portions 22a. For this purpose, the linking conveyor drive mechanism is coupled with the feed conveyor drive mechanism for driving the feed conveyor belts 66 synchronously with the linking conveyor at the aforesaid greater rate of travel.

The shaft 84 on which the drive sprockets 82 for the linking conveyor 26 are mounted is provided with an outer additional sprocket 190 on one side of the apparatus, adjacent to one side plate 25. The latter sprocket is coupled with an outer sprocket 192 on the feed conveyor drive shaft 46 by a link chain 194 trained on the sprockets. The feed conveyor drive shaft, the belt drive sprockets 48 thereon (FIG. 3), and the conveyor belts 66 driven thereby thus are driven synchronously with the linking conveyor 26 by the drive mechanism for the linking conveyor, including the shaft 84 thereof and a drive motor, not illustrated, coupled therewith. The sizes of the sprockets 48 and 192 on the feed conveyor drive shaft 46 and the sprocket 190 on the linking conveyor shaft 84 are such as to drive the feed conveyor belts 66 at a greater rate of longitudinal travel than the linking conveyor.

In operation, strands 22, which may be 160-foot lengths, are threaded over the guide rollers 34, through the holes 38 in the guide bar 36, between the feed conveyor belts 66 and the pressure rollers 60, and through the registering recesses 116, 136 of the first linking bar assembly 100a. The linking conveyor 26 is placed in operation, thereby also placing the feed conveyor 40 in operation, and thereafter, the operations are automatic. The strands unfold from the holders 20, are guided to the conveyor belts 66, and are conveyed thereon at a slight upward inclination and horizontally in the same direction as the path of the linking conveyor 26. The strands are aligned with the recesses 116, 136 in the linking bars, and as each linking bar assembly 100 approaches from below in its travel around the drive sprockets 82, the recesses thereof receive the strands. The strands are linked by the action of the operating mechanism 144 on the movable linking bars 98.

Should a strand break at the linking station, despite the above-described supply of excess strand length thereto, the feed conveyor 40 continues to feed the strand. The broken strand does not fall back into the holder 20, as would occur in the absence of the feed conveyor. If desired, the severed link or links may be removed, and for this purpose, the conveyors may be stopped temporarily.

Figure 16:
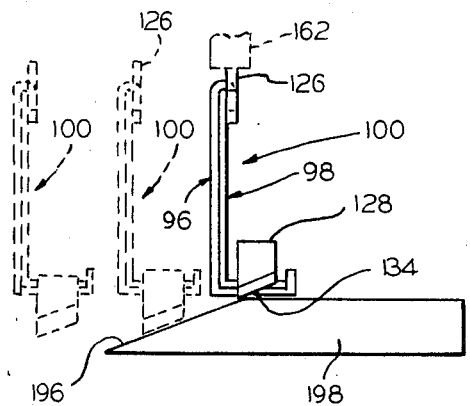
FIG. 16 is a diagrammatic view of the linking bar assembly in successive positions and a cooperative cam member, illustrating the manner in which the assembly is opened.

After being linked, the strands are carried by the linking conveyor 26 to succeeding processing stations. Ultimately, the linking bar assemblies 100 are opened and the product is removed. Thus, as illustrated in FIG. 16, the latch 128 on each assembly is raised by engagement of an inclined surface 196 on a cam member 198 with the inclined flaring end 134 of the latch. An operating mechanism like the mechanism 144 of FIG. 14 and including an engagement bar 162, but operating in the reverse direction, engages the operating pin 126 on the movable linking bar 98 and moves the movable bar from the position of FIG. 12 to that of FIG. 10, whereupon the strands may be removed from the recesses 116, 136. Thereafter, the linking bar assemblies are conveyed to the front end of the linking apparatus, shown in FIGS. 1 and 2, and the cycle of operation is repeated.

While a preferred embodiment of the invention has been described and illustrated, it will be apparent that various changes and modifications may be made therein within the spirit and scope of the invention.

We claim:

1. Apparatus for feeding a sausage strand in a given direction comprising, a horizontally extending endless conveyor, first and second rotary means horizontally spaced to support said horizontally extending endless conveyor along a substantially horizontal distance, said horizontally extending endless conveyor having a plurality of carrying elements, each of said elements having a concave carrying surface, the concave carrying surface of each of said elements being adapted to be horizontally aligned with the concave carrying surface of adjacent elements to provide a generally continuous horizontally extending, supporting and aligning conveyor surface for the strand, means for advancing said supporting and aligning conveyor surface along a horizontally extending path, a concave surface pressure roller above, vertically aligned and cooperating with said horizontally extending supporting and aligning conveyor surface for feeding the strand, and guide means mounted in advance of said horizontally extending supporting and aligning conveyor surface for aligning the strand therewith.

2. The apparatus of claim 1 wherein said guide means mounted in advance of said horizontally extending supporting and aligning conveyor surface comprise a member having a guide hole receiving the strand therein, and a guide roller having a concave surface and mounted in advance of said member.

3. The apparatus of claim 1 further including means for linking a sausage strand comprising a linking conveyor having successive transverse bars recessed for receiving the stand therein and means for driving said linking conveyor along a path extending horizontally in a given direction.

4. The apparatus of claim 3 further including means coupling the drive means of the linking conveyor and the means for advancing the horizontally extending supporting and aligning conveyor surface for driving said linking conveyor synchronously with advancing said horizontally extending supporting and aligning conveyor surface.

5. The apparatus of claim 4 wherein said linking bars include bars moveable transversely for linking the strand whereby the strand is moved transversely, and said coupling means are adapted for advancing said horizontally extending supporting and aligning conveyor surface at a greater rate than said linking conveyor to accommodate the transverse movement of the strand resulting from transverse movement of said moveable linking bars.

6. The apparatus of claim 5 wherein said guide means mounted in advance of said horizontally extending supporting and aligning conveyor surface comprise a member having a guide hole receiving the strand therein and a guide roller having a concave surface and mounted in advance of said member.

References Cited

UNITED STATES PATENTS

| | | | |
|---|---|---|---|
| 1,504,010 | 8/1924 | Zdechlik | 17—34 |
| 3,031,119 | 4/1962 | Allen et al. | 17—34 X |
| 3,059,272 | 10/1962 | Millenaar | 17—34 |
| 3,249,276 | 5/1966 | Van Bergen et al. | 226—196 |

LUCIE H. LAUDENSLAGER, Primary Examiner

U.S. Cl. X.R.

226—171, 196